United States Patent Office 3,275,736
Patented Sept. 27, 1966

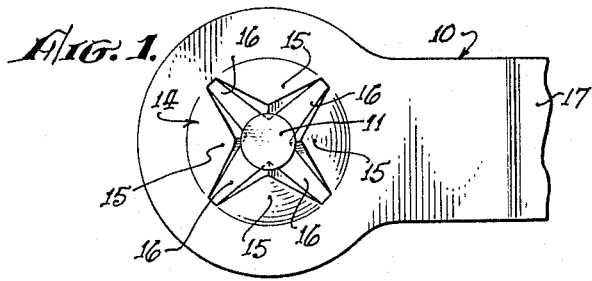
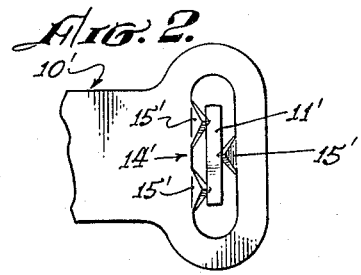
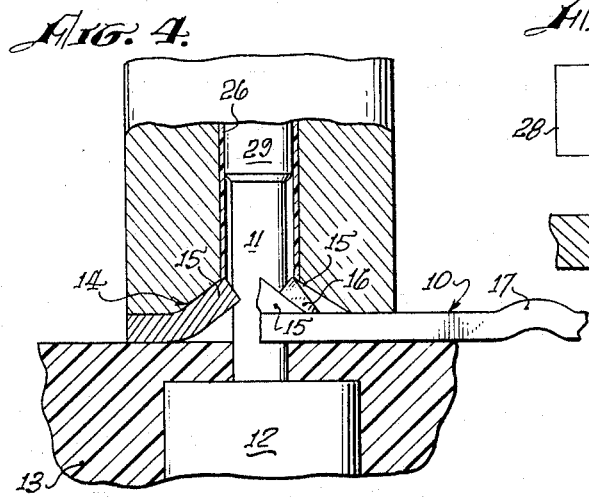
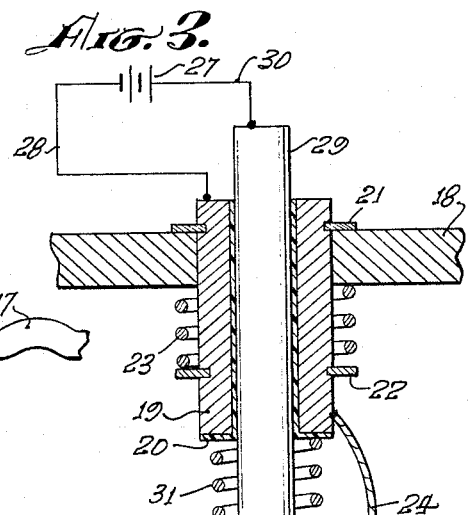
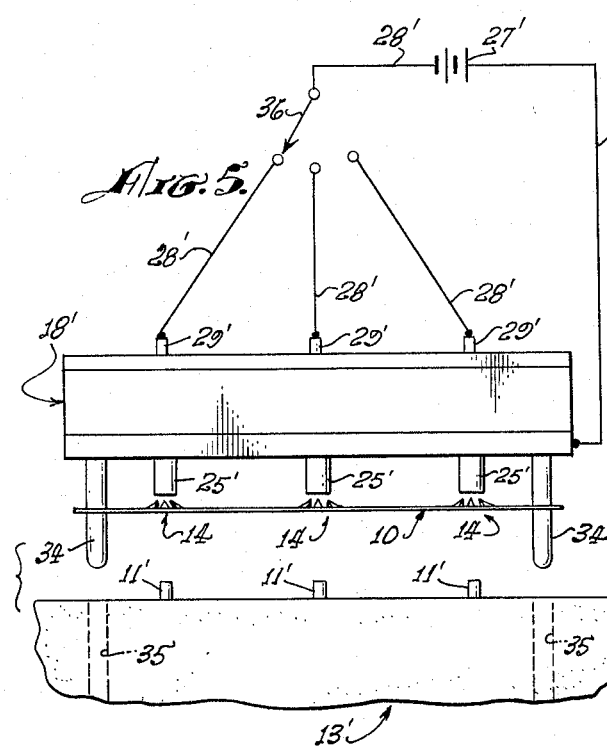
INVENTORS
WILLIAM HOTINE,
GUY A. MAXWELL,
ATTORNEY Sept. 27, 1966 W. HOTINE ETAL 3,275,736
APPARATUS FOR INTERCONNECTING ELEMENTS
Filed April 12, 1965 2 Sheets-Sheet 2
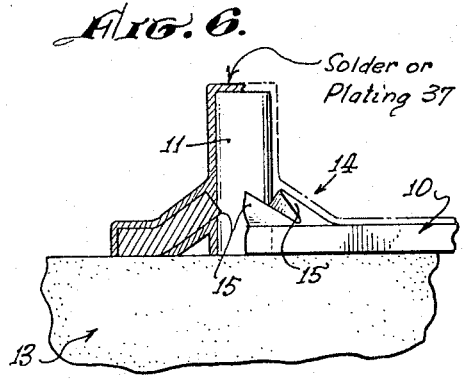
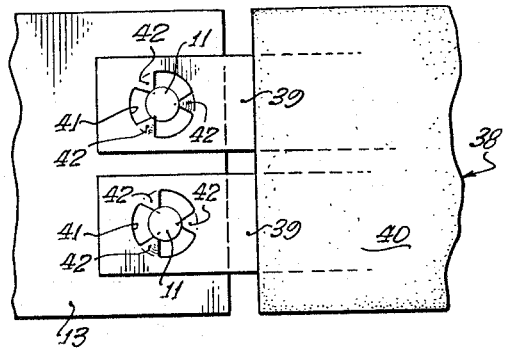
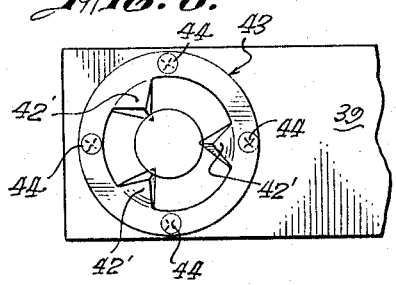
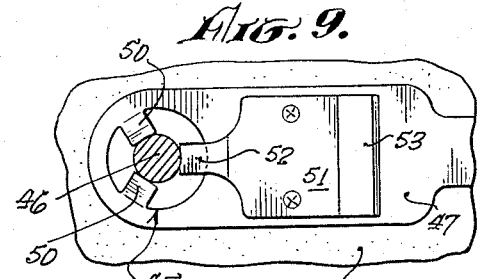
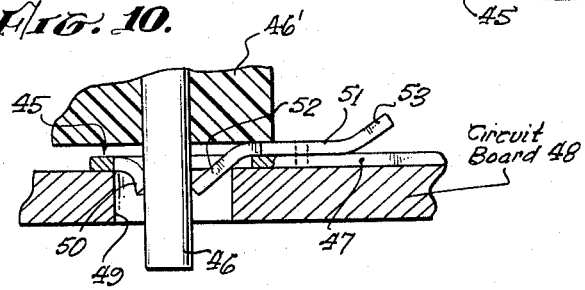
INVENTORS.
WILLIAM HOTINE,
GUY F. MAXWELL,
By
ATTORNEY.

3,275,736
APPARATUS FOR INTERCONNECTING
ELEMENTS
William Hotine, Idyllwild, and Guy F. Maxwell, Glendora, Calif., assignors to General Dynamics Corporation, Pomona, Calif., a corporation of Delaware
Filed Apr. 12, 1965, Ser. No. 447,362
9 Claims. (Cl. 174—84)

This invention relates to interconnection methods and apparatus, and particularly to a method and apparatus for interconnecting electronic components.

The use of miniature encapsulated electronic circuitry requires the interconnection of internal components and associated modules, with these interconnections having the desirable properties of minimum bulk and weight while also having maximum reliability, accessibility, convenience, and repairability.

Previous methods of weldng interconnections on electronic modules have relied on a mechanical joint produced by the bond of the weld bead alone. The electrical reliability is then a function of mechanical strength. If one weld is broken, the circuit malfunctions. Mechanical strength is a function of the quality of a single weld, which is hard to control, and may be affected adversely by a number of factors.

The present invention overcomes the above problems of the prior art in that it provides a redundant, multiple weld, with the mechanical strength of the joint independent of the weld, thus greatly improving the reliability of welded interconnections. The novel method of making interconnections employs thin conducting material provided with spring fingered openings fitting over and locking on to component lead wires protruding a short distance from the surface of the module. After the circuit is mechanically locked to the protruding wires the points of the spring fingers may be welded to the wires by the use of a coaxial electrode welding system. The method lends itself to an automatic production process and provides a number of redundant welds per connection thus increasing reliability. In addition, if desired, the connectors may be of the repairable type which provides easy and efficient serviceability of the interconnections.

Therefore, it is an object of this invention to provide electrical interconnections.

A further object of the invention is to provide a method for mechanically and electrically interconnecting associated electronic elements.

A still further object of this invention is to provide a highly reliable electrical connector unit.

Another object of this invention is to provide a repairable electrical connector unit.

Another object of the invention is to provide a method and apparatus for mechanically and electrically attaching component leads protruding from an electronic module to an associated circuit or conducting element.

Another object of the invention is to provide a method and apparatus for producing multiple electrical interconnections.

Another object of the invention is to provide connector units and welding apparatus for producing highly reliable redundant welded interconnections.

Other objects of the invention not specifically set forth above will become readily apparent from the following description and accompanying drawings in which:

FIG. 1 is a plan view of an embodiment of a connector unit utilized in the invention positioned on a circular terminal;

FIG. 2 is a plan view of an embodiment of the connector unit constructed for flat terminals;

FIG. 3 is a view partially in cross section of the welding apparatus of the invention operatively positioned for interconnecting a circuit with a module component;

FIG. 4 is an enlarged partial cross-sectional view of the end of the FIG. 3 welder electrodes and the spring-finger members of the FIG. 1 connector unit when positioned for interconnection of electronic components;

FIG. 5 is a view of a multiple welding arrangement operating on the same principle as illustrated in FIG. 3;

FIG. 6 is a view partially in cross-section illustrating dip soldering or plating of the completed interconnection;

FIG. 7 is a plan view illustrating another embodiment of the connector units adapted for flat flexible multiconductor cable applications;

FIG. 8 is a plan view illustrating the replaceable feature of the connector unit spring-finger members; and FIGS. 9 and 10 are plan and side elevation views illustrating the repairable feature of the connector unit.

Broadly, the invention relates to a resistance welding method and apparatus adapted for the connection of electronic module associated component leads to thin sheet circuit members or external connector members provided with spring-finger type connector units. The invention involves the insertion of component leads or the like through an opening in the sheet or connector member which is provided with finger-like tabs thereabout and welding of the individual tabs to the component lead. The welding apparatus includes a pair of concentrically arranged inner and outer electrode elements for respectively contacting the component lead and the finger-like tabs, associated spring mechanism for enabling relative movement of the electrodes into welding position with a simultaneous completion of the welding circuit, and appropriate electrical connections for energizing the electrodes from a suitable power supply. The use of soldering techniques instead of welding may be utilized with the spring-finger connector units, the connector units having various configurations and provided with repairable or replaceable finger members.

Referring now to the drawings, FIGS. 1 and 4 show a portion of a thin conducting member 10, such as a circuit path, in its installed position on lead 11 of component 12, component 12 being encapsulated in module 13, for example. Lead 11 extends from the surface of the encapsulated module 13, for example, a distance of approximately 1/16 inch. The thin conductor member 10 is made of suitable stiff material such as beryllium copper or phosphor bronze and includes an end portion defining a connector unit indicated generally at 14 which is comprised of four (4) spring fingers 15 pointing inwardly and separated by slots 16. The fingers 15 are provided with pointed ends to minimize the area of contact of the end of a finger with the surface of the component lead wire 11. The fingers 15 are so configured as to define an aperture with respect to the points of the fingers which is slightly smaller in dimension than the size of the component lead 11. It can be seen from FIG. 4 that the spring fingers 15 are formed to a dimple shape so that the conducting circuit member 10 will tend to center itself over the lead 11 when installed thereover. The conductor member 10 is provided with at least one bend as indicated at 17 which serves to relieve stresses caused thermally.

When the conductor member 10 is installed on component lead 11 the spring fingers 15 of connector unit 14 slide down over lead 11 scraping the surface of the lead with the pointed ends thereof and reaching a resting point as illustrated in FIG. 4 when the conductor member 10 is against the surface of the module 13. It is thus seen that the pointed ends of fingers 15 prevent the member 10 from pulling off lead 11 because the pointed ends of the fingers tend to dig into the lead.

As shown in FIGS. 3 and 4, the outer electrode of the welding apparatus described hereinafter serves to press the member 10 over lead 11. However, this operation may be accomplished in any suitable manner.

The FIG. 2 conductor member embodiment 10' is adapted for use with a flat terminal 11' and includes a connector unit 14' having a plurality of spring fingers 15' being dimpled in the same manner as illustrated in FIG. 4. The FIG. 2 embodiment is installed in the same manner as described above with respect to the FIG. 1 embodiment.

Referring now to FIGS. 3 and 4, the welding apparatus consists of a head or support 18 through which a support sleeve 19 extends, sleeve 19 being provided with insulating material 20 on its interior and lower end surfaces. Sleeve 19 is retained in header 18 via rings 21 and 22 which fit in grooves in the sleeve, rings 21 and 22 being on opposite sides of header 18 with a spring 23 positioned around sleeve 19 and interposed between ring 22 and the header 18. Sleeve 19 is connected electrically through a flexible wire 24 with a hollow cylindrical electrode 25, said electrode being configured on the end opposite the insulation to accommodate connector unit 14 and adapted to apply pressure to the connector unit 14 during installation as described above. Electrode 25 is provided with insulating material 26 on its interior and upper surfaces, electrode 25 being connected to a power source 27 via lead 28. A coaxial electrode 29 is slidingly positioned within sleeve 19 and electrode 25 and is connected through a lead 30 to power source 27. A pair of springs 31 and 32 are located intermediate the insulated end of sleeve 19 and electrode 25, positioned around electrode 29, and separated from each other by a retainer ring 33 mounted on electrode 29. Spring 31 is stronger than spring 32 while spring 23 is stronger than spring 31, thus the electrodes 25 and 29 are held in an extended position with respect to welding head 18.

In operation of the FIG. 3 welding apparatus the hollow electrode 25 is positioned around component lead 11 and on the connector unit 14 of conductor 10 if the conductor is previously positioned on the lead or the electrode 25 serves to pressure the conductor 10 over the lead 11. A predetermined pressure is applied to electrode 25 from welding head 18 via springs 23, 31 and 32 to provide the desired welding pressure when the head is moved toward the module 13 which in turn positions electrode 29 in contact with the top of lead 11. Upon electrode 29 contacting lead 11 a welding current is supplied from source 27 through the now completed circuit welding the points of spring fingers 15 to the component lead 11 thus providing a redundant weld joint for each interconnection.

FIG. 5 shows a multiple welding head 18' which has index pins 34 upon which a conductor 10 having a desired shaped pattern is indexed. Index pins 34 mate with indexing holes 35 in the module 13'. The circuit conductor 10 is provided with connector units 14, as described above, to fit over each protruding lead 11 of module 13'. The welding head 18' is composed essentially of a plurality of welding assemblies illustrated in FIG. 3 and described above.

In operation of the FIG. 5 device, when the multiple head 18' is pushed against the module 13', the multiple electrodes 25' push the conductor 10 down on the component leads 11', urged by springs 23, 31 and 32. Springs 32 is then compressed, and the ends of the coaxial electrode 29' are forced against the lead ends by springs 31, making a contact with leads 11' and completing the welding current circuit. A switch 36 connects the welding power source 27' to each welding electrode 29' in turn through leads 28' to weld the ends of the four spring fingers 15 to the surface of the associated component lead 11'.

With the above described welding technique redundant multiple welds are therefore obtained, with consequent high electrical reliability. The spring fingers 15 dig into the lead 11 under compression to afford a very tight and strong mechanical bond and to scrape the lead clean. The mechanical connection is very strong and will not loosen. The high pressure, cleanliness, and small area at the point of contact provide a reliable weld. The dimple shape of the spring fingered connector unit 14 and the conductor bends 17 allow for a variation of lead size and position and allows for thermal conditions, the hollow welding electrodes also allowing for some positional variation of the mating members of the system. It is therefore possible to have a simple completely automatic welding process using this invention as the length of the leads can be any desired dimension, multiple circuits or conductors can be sequentially deposited on them, with interleaved insulation layers. As the conductor member can be preformed into any desired circuit pattern, with any desired width conductors, electrostatic shields, magnetic shields, R.F. transformer lines, and ground planes can be deposited at any point in the sequence of operations. The welding heads are provided with the required pattern and number of electrodes to accomplish the desired sequential automatic operations, for example, at successive stations of a rotary automatic module assembling and welding machine. While a coaxial welding apparatus and technique has been illustrated and described herein, conventional cross-welding techniques can be utilized to weld the finger members to the lead, thereby providing a technique wherein each of the welding electrodes contacts the same type of material thus providing more uniform weld schedules.

The thin flat circuit conductors 10 may be formed by etching processes well known in the production of printed circuitry, and may be supported on an insulating sheet if desired. The preferable material is beryllium copper due to its favorable properties of high conductivity, high modulus of elasticity, ease of etching, hardness controllability, and absence of grain caused by rolling. Other materials such as Phosphor bronze or nickel plated with special alloys may be considered from the weldability or magnetic standpoints.

As shown in FIG. 6 an interconnection utilizing the spring-fingered connector unit 14 illustrated in FIG. 1, for example, can be either dip soldered or plated as indicated at 37 by conventional methods. The soldering or plating procedure can be utilized with or without the fingers 15 being welded to the component lead 11.

Referring now to FIGS. 7 and 8, a multi-conductor cable indicated at 38 and consisting of flat ribbon conductors 39 embedded in plastic layer 40 is connected to the terminals 11 of a module 13 by means of opening 41 in the ends of ribbons 39 having spring finger members 42 which fit tightly over each terminal 11. The openings 41 are similar to that illustrated at 14 in FIG. 1 except that only three fingers are utilized in this embodiment.

If it is desired to disconnect the multi-conductor cable 38 from the module 13, the conductors 39 are stripped off terminals 11 by any desirable method, such as the use of a tool resembling a miniature wheel puller, the removal thereof breaking the points off the finger members 42. To reinstall the conductors 39 on the terminals 11 of module 13, a washer-like member 43 (see FIG. 8) having internal spring fingers 42' is, for example, spot welded over the openings 41 of the flat conductors 39 as indicated at 44 thus providing a replaceable interconnection, whereby the cable 38 may be reconnected to the module 13. The interconnection may then be welded, if desired, in a manner as described above. Again suitable material, such as beryllium copper, is utilized to make the conductors 39 and replaceable washer-like member 43. Also, the washer-like members 43 may be initially used on conductors 39 if the conductors are not made of material suitable for the formation of an integral spring fingered opening, the washer merely being spot welded or otherwise mounted over a clearance hole in the conductors 39.

FIGS. 9 and 10 illustrate a repairable spring fingered connector unit generally indicated at 45 for interconnecting, for example, an electronic component lead 46 to a circuit 47 of a circuit board 48. In this embodiment, the board 48 is provided with an aperture 49 of sufficient size that the dimpled portion of the connector unit 45 extends therein as shown in FIG. 10. Connector unit 45 functions on the same principles as those described above except that it constitutes two fixed spring finger members 50 each having a flat end, and a removable tab member 51 having one end thereof configured to define a third flat end finger member 52 and the opposite end turned up as indicated at 53. Removable tab member 51 is attached to the circuit 47 by brazing or other suitable connection method. For example, the tab 51 may be made of beryllium copper and include a layer of fusible material on one side thereof which may be "surface" welded to the circuit thereby providing a repairable tab that can be re-welded a number of times without detracting from the electrical or mechanical qualities of the weld. Such re-weldable material is taught by U.S. Patent No. 3,150,288.

Connector 45 of FIGS. 9 and 10 differs from those previously described in that it is particularly adapted for accepting the leads 46 of plug-in type electronic components as illustrated at 46' which eliminates separate mechanical fastening means now utilized in the circuit board art. However, the FIGS. 9 and 10 embodiment can be constructed to be utilized in the same manner as the FIGS. 1 and 7 embodiments.

In operation of the FIGS. 9 and 10 embodiment the associated lead 46 is plugged into the connector unit 45 of circuit 47 with the flat ends of spring fingers 50 and 52 biting into the lead and locking the component in position mechanically, while at the same time making effective electrical contact. The spring fingers may be welded to the component lead, if desired, by use of the coaxial electrode welding apparatus described above.

If it is desirous to remove the component from the circuit board 48, the end 53 of tab 51 is grasped with pliers or other suitable tool and the tab is peeled off the circuit 47 thus freeing the lead from the jam lock of the fingers 50 and 52, whereby the component lead 46 can be easily removed from connector unit 45 of circuit 47.

A new tab member 51 can now be brazed or "surface" welded in proper position thus repairing the connector unit for further use.

If desirable, a single spring finger member may be used to retain a component lead or like element within an aperture, the point of the member and points on the edge of the aperture being welded to the lead. However, this approach does not provide the mechanical strength and other features of the multiple spring finger connection. Also, the finger member may be in the same plane as the circuit members without being dimpled as described above, the insertion of the lead between the fingers serving to bend or dimple the finger members. This approach does not provide the mechanical strength of the connection produced by pre-dimpled fingers nor does it provide the variable diameter feature of the pre-dimpled approach because close tolerances must be used in the non-dimpled application in order for the fingers to retain the lead therebetween. In addition component leads or the like may not have the physical strength to bend the finger members, thus requiring the fingers to be made of a material of less strength in order to have the variety of applications that the pre-dimpled approach provides.

It has thus been shown that the present invention provides a novel method and apparatus for interconnecting elements such as electronic components to suitable circuitry or connectors. By utilizing the spring-finger connector the lead is automatically centered in the space between the fingers, the stress on the fingers is equally divided, and high strength is produced due to the configuration of the finger members. The use of suitable metal, for example, beryllium copper, provides good conductivity and very high strength. After the fingers are pressed over the lead or the component lead pushed through the fingers, the interconnection is completely accessible to welding, soldering, or plating. Also the interconnection is completely accessible for inspection and test, both visually and electrically. The welding method and apparatus provides an efficient and effective manner of welding the interconnection which may be manually or automatically operated.

Although particular embodiments and manner of applications have been illustrated and described, modifications and changes will become apparent to those skilled in the art, and it is intended to cover in the appended claims all such modifications and changes as come within the spirit and scope of this invention.

What we claim is:

1. A device for electrically and mechanically interconnecting components comprising a conductor member having at least one opening therein and at least one replaceable connector unit removably secured over an opening of said conductor member, said connector unit being provided with an aperture in alignment with said conductor member opening and at least one finger-like element extending into said aperture, said finger-like element being provided with a pointed end extending at an angle with respect to the plane of said conductor member, said replaceable connector unit being electrically and mechanically secured to said conductor member, whereby the finger-like element is adapted to mechanically retain an associated component within said aperture and prevent the removal of the associated component from within the connector unit and the opening of the conductor member due to the pointed end of said finger-like element embedding into such associated component, and whereby the replaceable connector unit may be removed from said conductor member and replaced should said finger-like element be damaged during removal of the associated component from within said aperture of said connector unit.

2. The device defined in claim 1, wherein at least said finger-like element is constructed of beryllium copper.

3. A device for electrically and mechanically interconnecting components comprising a conductor member having at least one connector portion therein, said connector portion including an aperture and at least one finger-like element having at least a portion thereof extending into said aperture at an angle with respect to the plane of said conductor member, a replaceable finger-like element electrically and mechanically secured to said conductor member, said replaceable finger-like element extending into said aperture of said connector portion at an angle with respect to the plane of said conductor member, said finger-like elements being adapted to mechanically retain an associated component within said aperture, whereby said replaceable finger-like element can be readily removed to allow an associated component to be removed from within said aperture without damage to said connector portion or to an associated component, and whereby said replaceable finger-like element may be replaced by a similar element or be resecured on said conductor member.

4. The device defined in claim 3, wherein said replaceable finger-like element is provided with an end portion bent at an angle with respect to the plane of said conductor member, whereby said replaceable finger-like element may be readily removed by application of suitable means to said end portion thereof.

5. The device defined in claim 3, wherein said replaceable finger-like element is at least partially provided with a coating of fusible material on the side thereof adjacent said conductor member, whereby said replaceable finger-like element may be connected to said conductor member by a surface welding technique.

6. The device defined in claim 3, wherein at least said replaceable finger-like elements are constructed of beryllium copper.

7. In combination, an electronic module having component leads extending therefrom, and a conductor connected to at least one of said component leads; said conductor being provided with a connector unit for mechanically and electrically interconnecting the conductor with the component lead, said connector unit including a replaceable member electrically and mechanically secured to said conductor, said replaceable member having an aperture and a plurality of finger-like members with pointed ends, said pointed ends of said finger-like members being in contact with the component lead and mechanically retaining said component lead within said replaceable member aperture of said connector unit, said finger-like members extending in a plane different than the plane of the conductor, said finger-like members of said replaceable member being welded to said component lead, whereby said finger-like members prevent the removal of said component lead from within said connector unit due to the pointed ends of said finger-like members being embedded into said component lead and providing redundant mechanical and electrical interconnection points between said conductor and said component lead, and whereby said conductor can be utilized after removal of said component lead from within said connector unit by the removal and replacement of said removable member should same be damaged by the removal of said component lead.

8. In combination, an electronic module having component leads extending therefrom, and a conductor connected to at least one of said component leads; said conductor being provided with a connector unit for mechanically and electrically interconnecting the conductor with the component lead, said connector unit including a plurality of finger-like members, at least one removable finger-like member electrically and mechanically secured to said conductor, said finger-like members having at least a portion thereof extending in a plane different than the plane of the conductor, said finger-like members mechanically retaining said component lead within said connector unit, said finger-like members being welded to said component lead, whereby said finger-like members and said weld prevent the removal of said component lead from within said connector unit providing redundant mechanical and electrical interconnection points between said conductor and said component lead, and whereby said removeable finger-like member can be readily removed to allow the conductor to be removed from the component lead without damage to either, and whereby said removable finger-like member may be replaced by a similar member or be resecured to said conductor member for attaching same to a component lead.

9. The combination defined in claim 8, wherein said removeable finger-like member is at least partially provided with a coating of fusible material on the side thereof adjacent said conductor member, whereby said removable finger-like member is secured to said conductor by a surface type weld.

References Cited by the Examiner
UNITED STATES PATENTS

| | | | |
|---|---|---|---|
| 1,176,762 | 3/1916 | Lachman | 219—86 |
| 2,961,528 | 11/1960 | Dixon | 219—98 |
| 2,965,812 | 12/1960 | Bedford. | |
| 3,022,480 | 2/1962 | Tiffany | 339—18 |
| 3,039,798 | 6/1962 | Carlson et al. | 219—107 X |
| 3,079,577 | 2/1963 | Brownfield | 339—17 |
| 3,089,020 | 5/1963 | Hurlebaus | 219—86 |
| 3,151,278 | 9/1964 | Elarde | 317—101 |
| 3,200,020 | 8/1965 | Schroeder | 174—68.5 X |
| 3,209,066 | 9/1965 | Toomey et al. | 174—68.5 |

References Cited by the Applicant
UNITED STATES PATENTS

| | | |
|---|---|---|
| 1,874,593 | 8/1932 | Olson. |
| 2,231,480 | 2/1941 | Pilger. |
| 2,433,384 | 12/1947 | McLain. |
| 2,462,561 | 2/1949 | Schneider. |
| 2,593,479 | 4/1952 | Nieter. |
| 2,967,285 | 1/1961 | Freitas. |
| 3,060,402 | 10/1962 | Olsson et al. |

LARAMIE E. ASKIN, *Primary Examiner.*

DARRELL L. CLAY, LEWIS H. MYERS, *Examiners.*